UNITED STATES PATENT OFFICE.

EDWARD HART, OF EASTON, PENNSYLVANIA.

METHOD OF UTILIZING NITER CAKE.

1,258,895. Specification of Letters Patent. Patented Mar. 12, 1918.

No Drawing. Application filed May 24, 1917. Serial No. 170,607.

*To all whom it may concern:*

Be it known that I, EDWARD HART, a citizen of the United States, residing at Easton, in the county of Northampton and State of Pennsylvania, have invented certain new and useful Improvements in Methods of Utilizing Niter Cake, of which the following is a full, clear, and exact description.

This invention relates to the utilization of the residue (commonly called niter cake) discharged from the pots used in the manufacture of nitric acid, and its chief object is to provide an effective method of recovering the sulfuric acid and reëmploying the same in the production of nitric acid. Niter cake ordinarily contains about 64 per cent. sodium sulfate, 32 per cent. sulfuric acid, 4 per cent. water, and sometimes a trace of iodin.

In carrying out the method in the preferred manner the niter cake is dissolved in water, preferably with enough of the latter to give a solution of a specific gravity of about 1.30. If iodin is present a little sulfurous acid is then added and the liquid boiled. In the boiling the iodin distils off, and is collected in any convenient way. The amount of sulfurous acid used is carefully regulated so that just half as much is added as would be needed to produce a blue color with starch paste present.

The solution, substantially free of iodin, is now strongly cooled and the temperature lowered to about $-40°$ C. by one or more successive freezings, preferably by blowing in compressed and expanded (and therefore cold) air in small bubbles through the solution. The strong cooling causes crystallization of a very large proportion of the sodium sulfate (Glauber salt). The granular mass is allowed to attain ordinary temperature and is then washed with a cold solution of sodium sulfate, after which the crystallized sulfate is removed, as by means of a centrifugal separator.

The mother liquor remaining, containing nearly all the sulfuric acid is concentrated by the usual method of concentrating sulfuric acid to remove all or nearly all the water, and is run still warm into the nitric acid still for the treatment of a fresh charge of nitrate.

The method of crystallizing the sulfate is an important feature. In prior processes the foregoing is effected by means of ordinary ice machines, which is a slow procedure owing to the poor heat-conductivity of the solution. Moreover, the crystals formed are large and inclose mother liquor. But when sufficient cold air is blown into the solution, as in my method, minute crystals are formed which continually grow larger until a granular mass is produced which does not inclose mother liquor and can readily be washed perfectly in a centrifugal.

It is to be understood that the invention is not limited to the details of procedure herein specifically described, but can be practised in other ways without departure from its spirit as defined by the appended claims.

I claim—

1. The method of utilizing niter cake, comprising dissolving the same in water, cooling the solution to a temperature of about $-40°$ C. to crystallize sodium sulfate in a granular mass, and removing the latter from the mother liquor.

2. The method of utilizing niter cake, comprising dissolving the same in water to a specific gravity of about 1.30, cooling the solution to about $-40°$ C. to crystallize sodium sulfate in a granular mass, and removing the sulfate from the mother liquor.

3. In a method of utilizing niter cake, the steps comprising dissolving the same in water, and blowing cold air through the solution to strongly cool the same whereby sodium sulfate is crystallized in a granular mass.

In testimony whereof I hereunto affix my signature.

EDWARD HART.